CLIFFORD A. SHANK,
NORMAN M. BROWN, JR.
INVENTORS.

March 6, 1956 C. A. SHANK ET AL 2,737,619
ELECTRONIC SYNCHRONIZING SYSTEM FOR MOTORS
Filed Oct. 3, 1950 2 Sheets-Sheet 2

CLIFFORD A. SHANK,
NORMAN M. BROWN, JR.
INVENTORS.

BY John H. J. Wallace

United States Patent Office 2,737,619
Patented Mar. 6, 1956

2,737,619

ELECTRONIC SYNCHRONIZING SYSTEM FOR MOTORS

Clifford A. Shank, Redondo Beach, and Norman M. Brown, Jr., Los Angeles, Calif., assignors to The Garrett Corporation, Los Angeles, Calif., a corporation of California Application October 3, 1950, Serial No. 188,164

13 Claims. (Cl. 318—73)

Our invention relates to electronic synchronizing systems in general, and particularly relates to systems for achieving by electronically controlled means the in-step synchronization of a plurality of electric motors or other electrical translatory devices.

The principal object of this invention is to provide control means whereby the numbers of revolutions made by such motors, or the distances traversed by such electrical translatory devices, are maintained substantially proportional, or in "phase coincidence." A proportionality of 1:1 is generally desired, but any desired proportionality is within the scope of the invention. Also, since elapsed running time is a constant it will simplify the description to refer generally to motor speed or R. P. M., it being remembered that proportionality of numbers of revolutions is the desired end and is attained with the system disclosed herein.

Conventional motor synchronizing controls are usually predicated on the "master and slave" arrangement. That is, one controlling master motor or motor control always dictates synchronizing effects to the controlled slave motors. Our invention has for a general object a synchronizing system wherein the system is the master of a plurality of motors, and any one motor becoming asynchronous or dephased becomes the slave of the system until such time as it again becomes synchronized with the system. It is a further object to provide synchronizing control over either the slowest or the fastest one of a plurality of motors, whereby its speed is increased or reduced until it is returned to synchronism.

It is a further object to reduce the effective speed of a fast asynchronous motor by stopping and starting it for varying intervals of time until it is synchronized. It is an object to provide such on and off operation of an asynchronous motor by means of a novel electronic control circuit.

It is a further object to provide an electronic control circuit which senses the degree of asynchrony of a motor in a system and returns that motor to synchronism in a relatively short period of time, without overshooting, whereby hunting of the asynchronous motor for synchronism with the system is eliminated. By the use of our novel electronic circuit, if an asynchronous motor overshoots the synchronous position for any reason (as for example, malfunctioning of the electronic circuitry) then that motor will not reverse and a condition of hunting cannot exist.

It is a still further object to provide an electronic control circuit which pulses an asynchronous motor into synchronism by means of "on-off" pulses, the relative length of time of the "on" pulses being substantially inversely proportional to the degree of asynchrony and the relative length of time of the "off" pulses being substantially directly proportional to the degree of asynchrony. Stated differently, for a large degree of asynchrony the length of time of the "off" pulse is relatively large, followed by an "on" pulse of relatively short duration. As the asynchronous motor approaches synchronism the length of time of the "off" pulse progressively becomes relatively shorter followed by an "on" pulse of progressively relatively longer duration. It is an object to provide such pulsing effect by means of the resultant control element voltages applied to the electronic control circuit by means of an integrating R/C network.

As used herein, the word "synchronous" may be interpreted as including "phase coincidence" and the word "asynchronous" as including "out of phase coincidence."

The invention will be described as used with a pair of bi-directional alternating current motors adapted to drive desired objects in synchronism between limits of movement. It will be apparent to those skilled in the art that the invention is not limited to such motors, but may be employed with other alternating or direct current types of motors.

Referring to the drawings.

Figure 1:
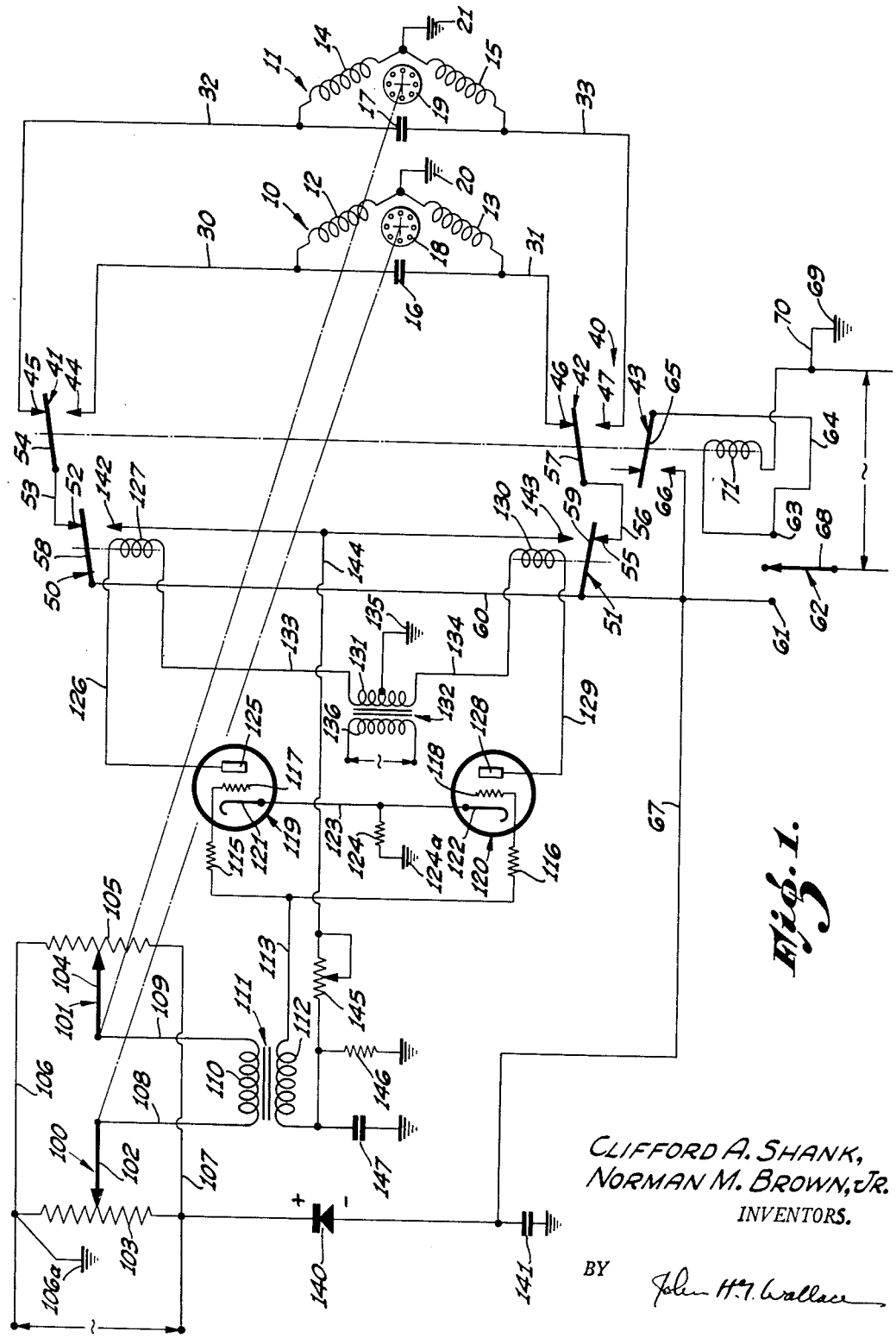
Fig. 1 is a schematic diagram of the application of our invention to the control of two motors.

Referring to Fig. 1, a pair of single phase alternating current motors 10 and 11 are shown, motor 10 having fields 12 and 13 and motor 11 having fields 14 and 15 for bi-directional operation between limits of rotative movement of the rotors. Phase splitting capacitors 16 and 17 are connected respectively to one end of each of the fields 12 and 13 and to one end of each of the fields 14 and 15, as shown. Fields 12 and 13 of motor 10 are joined at the other end of each and grounded at 20. Likewise, fields 14 and 15 of motor 11 are joined at the other end of each and grounded at 21. Rotors 18 and 19 of well-known squirrel-cage type complete the motor assemblies. It is now seen that if alternating current is supplied to motor 10 through a conductor 30 and ground 20 the motor will rotate one direction, whereas if current is supplied through a conductor 31 and ground 20 the motor will rotate in the opposite direction. Likewise, if current is supplied to motor 11 through a conductor 32 and ground 21 the motor will rotate in one direction, whereas if current is supplied through a conductor 33 and ground 21 the motor will rotate in the opposite direction.

Magnetic switch means for controlling the direction of rotation of the motors is shown as a relay 40 comprising switches 41, 42, and 43. Contacts 44 and 45 of switch 41 are connected to conductors 30 and 32, respectively, and contacts 46 and 47 of switch 42 are connected to conductors 31 and 33, respectively.

Additional magnetic relay switch means 50 and 51 control the supply of current to either or both the motors, contact 52 of relay 50 being connected by a conductor 53 to the movable contact 54 of relay switch 41, and contact 55 of relay 51 being connected by a conductor 56 to the movable contact 57 of relay switch 42. Movable contacts 58 and 59 of switches 50 and 51, respectively, are joined by a conductor 60 to contact 61 of selector switch 62. Another contact 63 of switch 62 is connected by a conductor 64 to the movable contact 65 of relay switch 43. Contact 66 of switch 43 is connected by conductor 67 to the contact 61 of switch 62. A movable contact arm 68 on switch 62 is provided to supply alternating current for operation of the motors 10 and 11 in a forward or reverse direction by being thrown to either one of contacts 61 or 63. The other side of the alternating current source is grounded, as at 69, through a conductor 70. A magnetic field coil 71 for providing operation of the relay 40 (and hence of switches 41, 42, and 43) is shown as connected to contact 63 of switch 62, and to the grounded side of the alternating current source.

When arm 68 is thrown to contact 61, current is now supplied direct to the windings of motor 10 through conductor 60, contact arm 59, contact 55, conductor 56, contact arm 57, contact 46, and conductor 31. The current in winding 12, as phase displaced by the action of capacitor 16, now causes motor 10 to rotate in what may conveniently be designated as a forward direction. Likewise, current is now supplied direct to the windings of motor 11 through conductor 60, contact arm 58, contact 52, conductor 53, contact arm 54, contact 45, and conductor 32, thereby causing that motor to rotate in what is designated as a forward direction by virtue of the phase displaced current in winding 15 due to the action of capacitor 17.

When arm 68 is thrown to contact 63, current is then supplied to winding 71 of relay 40, thereby causing arm 54 of switch 41 to break from contact 45 and make with contact 44, arm 57 of switch 42 to break from contact 46 and make with contact 47, and arm 65 of switch 43 to make with contact 66. Current is then supplied direct to the windings of motor 10 through conductor 64, contact arm 65, contact 66, conductors 67 and 60, contact arm 58, contact 52, conductor 53, contact arm 54, contact 44, and conductor 30. Phase displaced current is now supplied to winding 13, thereby causing motor 10 to rotate in a reverse direction. Likewise, current is now supplied direct to the windings of motor 11 through conductor 64, contact arm 65, contact 66, conductors 67 and 60, contact arm 59, contact 55, conductor 56, contact arm 57, contact 47, and conductor 33. Phase displaced current is now supplied to winding 14 to cause the motor to rotate in the reverse direction.

It is thus seen that switch 62, with the cooperation of relay switches 41, 42 and 43 is a simple reversing switch for selectively governing the direction of rotation of two single phase motors 10 and 11. It is apparent, of course, that other switching methods could readily be devised by one skilled in the art for selectively governing the direction of rotation of other types of single phase or polyphase motors, or of direct current motors, or of any combination of the aforesaid types.

Control means for synchronizing the motors 10 and 11, when operating in either the forward or reverse direction, include the relay switches 50 and 51 which are adapted to interrupt the current to the asynchronous motor in a novel manner now to be described. The control means also includes translation displacement means for electrically sensing the asynchronism of the two motors when such occurs and for providing a phase-determined alternating current voltage pickoff in a manner to be described. Completing the major components of the control means are other means for transforming the pickoff voltage to either of the switches 50 or 51 in order to energize them, the transforming means herein being exemplified by a phase-discriminating electronic circuit.

The aforesaid displacement means are exemplified in our embodiment of the invention by the potentiometers 100 and 101 which are adapted to be driven by the motors 10 and 11, respectively, through appropriate gear reduction means not shown between limits of rotative movement of the rotors. Potentiometer 100 includes an arm 102 driven by motor 10 in sliding contact with a resistor 103. Potentiometer 101 includes an arm 104 driven by motor 11 in sliding contact with a resistor 105. The ends of resistors 103 and 105 are connected to an alternating current source by means of conductors 106 and 107. The sliding contact arms 102 and 104 are connected by conductors 108 and 109 to one winding 110 of a transformer 111. Conductor 106 is grounded, as at 106a.

One end of the other winding 112 of transformer 111 is connected by conductor 113 to isolating resistors 115 and 116 which, in turn, are connected to the control elements or grids 117 and 118 of the thermionic electron tubes 119 and 120, respectively. The cathodes 121 and 122 of the tubes are joined by a conductor 123 through bias resistor 124 to a ground 124a. The anode 125 of tube 119 is connected by conductor 126 to one side of the field coil 127 of the magnetic switch 50, while anode 128 of tube 120 is connected by conductor 129 to one side of the field coil 130 of magnetic switch 51. The other sides of the coils 127 and 130 are connected in series with the winding 131 of a transformer 132 by means of conductors 133 and 134, a center tap of the winding 131 being grounded at 135. The other winding 136 of transformer 132 is connected to an alternating current source which may be in phase or 180° out of phase with the alternating current source connected to the conductors 106 and 107.

It is now seen that the anode 125 is supplied by alternating current which is 180° out of phase with that supplied to anode 128, whereas the phase of the alternating current supplied to both the grids 117 and 118 may be in phase with either that at anode 125 or that at anode 128, or will be zero. The determining factor as to the phase relationship is the relative positions of the contact arms 102 and 104 with respect to the resistors 103 and 105, and this relative position is determined by the relative synchronism of motors 10 and 11. That is, if motors 10 and 11 are in synchronism while running (in a forward direction, for example), arms 102 and 104 will be electrically balanced with respect to resistors 103 and 105 and there will be no current output to the winding 110 of transformer 111, and thus no alternating current applied to the grids 117 and 118. Under this condition of zero voltage being applied by the transformer 111 to the grids, the current which normally flows in the cathode-anode circuits of tubes 119 and 120 through the coils 127 and 130 will be insufficient to energize those coils to actuate the movable contacts 58 and 59 of switches 50 and 51, hence an uninterrupted flow of current to motors 10 and 11 is maintained.

If, however, motor 10 slows down for any cause, arm 102 will be electrically displaced on resistor 103 with respect to the position of arm 104 on resistor 105 and a current will flow in winding 110 of transformer 111 so as to cause a voltage to appear at the grids 117 and 118. This voltage will be in phase with the voltage appearing at anode 125 but out of phase with the voltage at anode 128, hence sufficient additional current will flow in the anode and cathode circuit of tube 119 so as to cause the coil 127 of switch 50 to be energized and open the contacts 52 and 58, thereby interrupting the current to the windings of motor 11 and causing it to stop. When motor 10 subsequently causes arm 102 to become electrically balanced with arm 104, current will cease to flow to winding 110 of transformer 111, and the voltage on the grids 117 and 118 will drop to zero, whereupon anode current will decrease in tube 119, thus de-energizing coil 127 and allowing switch 50 to close the power circuit to motor 11.

It is also seen that if motor 11 slowed down, the voltage appearing at the grids 117 and 118 would be in phase with that appearing at anode 128 and out of phase with that appearing at anode 125. In that event the coil 130 of switch 51 would be energized so as to open the power circuit to motor 10 until such time as arm 104 was caused by motor 11 to become electrically balanced with arm 102.

In this manner the power circuit to the faster of the two motors is interrupted until the slower motor "catches up" to proportional-rotation synchronism with the other motor.

When one motor is stopped there is the possibility that the motor still running will pass through the synchronous position before the stopped motor is again energized and this operation results in an unwanted condition which is in the nature of a hunt, whereby the motors are alternately stopped and started in seeking synchronism. In order to obviate this undesirable cyclic condition we provide a novel means for biasing the grids of the tubes 119 and 120 when either of the coils 127 and 130 of the switches 50 or 51 is energized. A negative potential source for biasing the grids may conveniently take the form shown here in the rectifier 140 and filter capacitor 141, the positive side of the rectifier being connected to one side of the alternating current source and the negative side through conductor 67 to the conductor 60 which is common to the contact arms 58 and 59 of switches 50 and 51, respectively. Contacts 142 and 143 of switches 50 and 51 are joined by a conductor 144 to one side of a variable resistor 145, the other side of which is grounded through resistor 146. The common terminal of resistors 145 and 146 is connected to winding 112 of transformer 111 and to one side of a capacitor 147, the other side of which is grounded. The resistors 145 and 146 and capacitor 147 constitute an integrating R/C network which will apply a modulating negative bias to the grids 117 and 118 of tubes 119 and 120 when either of the coils 127 or 130 of switches 50 or 51 are energized, and the voltage-time effect of this bias will be in accordance with the R/C time constant of the network. The novel operation of the control as modulated by the network action will now be described.

Assume that switch lever 68 is thrown to contact 61 to energize motors 10 and 11 in a forward direction and that the motors then are initially running in synchronism. Assume further that thereafter the motor 10 is suddenly slowed down, as by the momentary application of a heavy load. As hereinbefore described, the resultant asynchronism of the motors upsets the electrical balance of the potentiometers 100 and 101 whereby a voltage will appear at the grids 117 and 118 of tubes 119 and 120, the measure of the voltage being substantially proportional to the asynchronism of the motors (in the assumed case of a heavy load, the voltage would be relatively large). By reason of the direction of unbalance, the voltage on the grids 117 and 118 will be in phase with the voltage on anode 125 of tube 119 whereupon current will flow in coil 127 of switch 50 to open contacts 52 and 58 and to close contacts 58 and 142. The opening of contacts 52 and 58 interrupts current to the motor 11 and the closing of contacts 58 and 142 places a negative bias on the grids 117 and 118, in addition to the alternating bias, which negative bias builds up somewhat slowly because of the nature of the integrating network.

Figure 2:
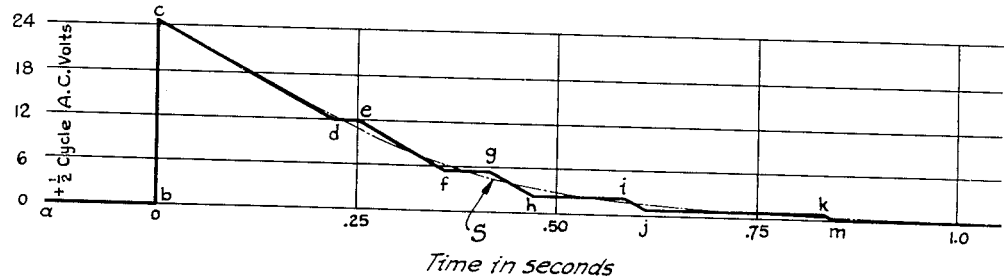
Fig. 2 is a graph of alternating current voltages applied to the control elements of our electronic circuit.
Figure 3:
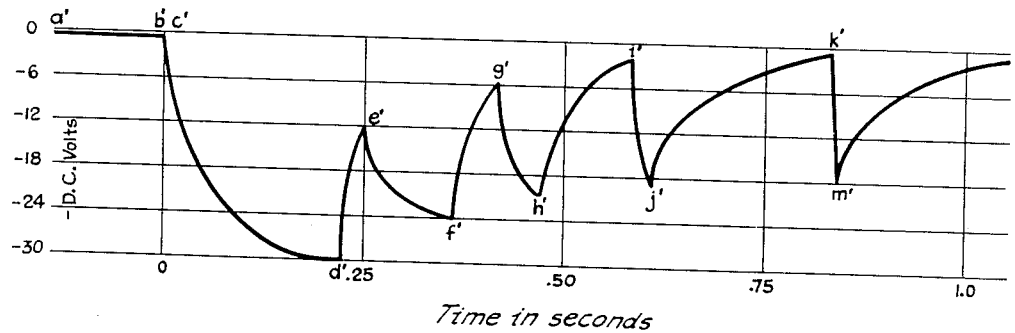
Fig. 3 is a graph of concurrent direct current voltages applied to the control electronic elements.
Figure 4:
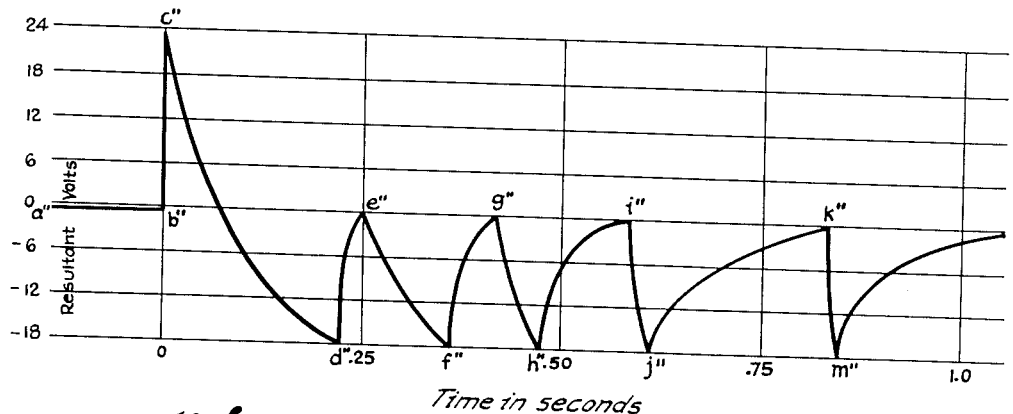
Fig. 4 is a graph of the resultant voltages of Figs. 2 and 3.

Referring to Figs. 2, 3 and 4, the entire synchronizing action of our novel electronic control means is depicted in a simulated operation under the conditions assumed above.

From points $a$, $a'$, and $a''$, to points $b$, $b'$ and $b''$, the motors are operating in synchronism. At point $b$ a momentary heavy load is placed on motor 10, for example, causing it to immediately slow down, thus causing a large alternating current voltage $b-c$ (Fig. 2) to appear on the grids of the tubes in phase with the voltage on anode 125 of tube 119. Relay switch 50 is immediately energized to open the power circuit of motor 11 and close the negative bias circuit of the network. Since motor 10 is still running, and since motor 11 is now stopped, the alternating current voltage appearing at the grids of the tubes will decrease linearly, as depicted by line $c-d$ (Fig. 2). Concurrently, the closing of the negative bias circuit of the network causes a direct current of negative polarity to be applied to the grids, the character of that voltage being depicted by the line $c'-d'$ (Fig. 3).

Turning now to Fig. 4, the resultant grid voltage is shown. It will be noticed that from point $a''$ to $b''$ a small negative bias on the grids is shown. This may be characterized as the equivalent of the positive bias applied to the cathodes 121 and 122 of tubes 119 and 120 by the action of the bias resistor 124. Voltage $b''-c''$ is the resultant of alternating current voltage $b-c$, and voltage $c''-d''$ is the resultant of voltages $c-d$ and $c'-d'$. When the resultant voltage on grid 117 decreases to the value $d''$ the current in the anode circuit of tube 119 has decreased to a point where the coil 127 of relay switch 50 is de-energized thereby opening contacts 58 and 142 and closing contacts 58 and 52. The opening of contacts 58 and 142 removes the supply of negative polarity voltage from the network, and the negative voltage on the grids then bleeds off to ground potential through the resistor 146. The character of this bleed voltage is depicted by line $d'-e'$ (Fig. 3). Concurrently, the closing of contacts 58 and 52 causes motor 11 to resume running, hence with both motors now running the alternating current applied to the grids will remain substantially constant, as shown by line $d-e$ (Fig. 2).

Referring again to Fig. 4 the resultant grid voltage due to alternating current voltage $d-e$ and direct current voltage $d'-e'$ is shown as line $d''-e''$. When the resultant voltage attains the value $e''$ the anode current in the tube 119 has again increased to the value sufficient to energize coil 127 of switch 50. Operation of switch 50 again initiates the cycle just described, hence the motor 11 will stop and start alternately as indicated by the points $c$ and $d$, $e$ and $f$, $g$ and $h$, $i$ and $j$, and $k$ and $m$, respectively, at which latter point the motors will be in synchronism and will continue to so-run until one or the other again becomes asynchronous.

As above described, it has been assumed that the application of the load to motor 10 was of such a nature as to only cause the motor to momentarily slow down, and that the load was subsequently reduced or removed so that motor 10 would resume a speed ordinarily such that it would run in synchronism with motor 11.

However, if motor 10 slowed down from normal speed and continued to run slowly then the action of the control means would differ from that shown in Figs. 2, 3 and 4, in that the alternating current on the grids would never reach zero at point $m$. In effect, the motor 11 would be continuously pulsed on and off somewhat in a manner depicted by the lines $j-k$ and $k-m$, probably with not quite so steep a slope to the lines $c-d$, $e-f$, $g-h$, $i-j$, etc. With one motor loaded and the other one unloaded it is seen that there is a possibility of a slight upward rise to the horizontal lines $d-e$, $f-g$, $h-i$, $j-k$, etc., which would to some extent cancel out the rapid drops of lines $c-d$, $e-f$, $g-h$, $i-j$, $k-m$, etc.

The action of the integrating network (in alternately applying negative direct current to the grids and then bleeding it off) is a constant, hence the slopes of the various curves $c'-d'$, $d'-e'$, etc. will vary only to an extent which depends on the voltages applied at $c'$, $d'$, $e'$, etc. Thus by varying the values of resistors 145 and 146 and capacitor 147, the action of the synchronizing system may be varied to meet any anticipated conditions of asynchrony or any know dissimilarities of the motors being synchronized.

On Fig. 2, a dot-dash line S has been drawn to show substantially the average "on and off" time periods of the motor which is being brought into synchronism. The characteristic slope of this line depends on several factors, among which are, $(a)$ the extent of departure from synchronism (hence the value of alternating current voltage applied to the tube grids), $(b)$ the value of the direct current voltage applied to the R/C network, and $(c)$ the electrical values of the network.

Generally, it is desirable that the asynchronous motor be caused at least to approach synchronism as quickly as possible, and this is done by fixing the factors mentioned in $(a)$, $(b)$ and $(c)$ above at values such that the initial slope of the line S is relatively steep. In the latter stages of synchronism the slope of line S levels off. The change of slope is achieved by varying the length of "on" time and the length of "off" time of the asynchronous motor, and these varying time lengths are obtained by means of our novel electronic circuit.

The curves shown in Figs. 2, 3, and 4 are, of course, merely exemplary, since the actual curves of any particular synchronizing system setup according to the invention may differ materially from those shown.

We have described our system as utilizing the phase difference of alternating currents applied to the grids and anodes of electronic tubes for control purposes. In addition, means for applying alternating current grid voltages which vary directly with degree of asynchrony, are shown in the preferred embodiment as constituting variable resistances.

We claim:

1. In a system employing a plurality of electrical translation devices whose movements are to be synchronized, a source of power, a supply circuit coupling said devices with said source of power, and control means in said circuit for controlling the operation of said devices, apparatus for re-synchronizing and returning into phase coincidence any one of said devices which has become asynchronous with respect to the remaining devices, comprising: signal means coupled to said devices for developing a signal in response to asynchronization of one of said devices; control circuit means coupling said signal means with said supply circuit for impressing said signal on said control means to vary the operation of said one of said devices; a source of uni-directional voltage; and network means including said control means coupling said source of uni-directional voltage with said signal means in response to operation of said control means to develop a resultant signal controlling said control means.

2. In a system employing a plurality of electrical translation devices whose movements are to be synchronized, a source of power, a supply circuit coupling said devices with said source of power, and control means in said circuit for selectively controlling the operation of said devices, apparatus for re-synchronizing and returning into phase coincidence one of said devices which has become asynchronous with respect to the remaining devices, comprising: signal means coupled to said devices for developing a signal in response to asynchronization of one of said devices, the measure of said signal being a function of the degree of asynchrony; control circuit means coupling said signal means with said supply circuit for selectively impressing said signal on said control means to vary the operation of said one of said devices; a source of uni-directional voltage; and network means coupled to said control means for connecting said source of uni-directional voltage to said signal means in response to operation of said control means to develop a resultant signal controlling said control means.

3. In a system employing a plurality of electrical motor devices which are to be maintained in synchronism, a source of power, a supply circuit coupled between said source of power and each of said devices, and switch means in said supply circuit individual to each of said devices for selectively controlling the operation thereof, apparatus for synchronizing again, and returning into phase coincidence, one of said devices which has become asynchronous with respect to the remaining devices, comprising: signal means coupled to said devices for developing a signal in response to asynchronization of said one of said devices; means coupled to said signal means and to said supply circuit for selectively impressing said signal on the switch means associated with said one of said devices to vary the operation thereof; a source of uni-directional voltage; and circuit means coupled to said switch means for connecting said source of uni-directional voltage to said signal means in response to operation of one of said switch means to develop a resultant signal controlling said switch means.

4. In a system employing a plurality of electrical translation devices which are to be maintained in synchronism, the combination of: a source of power; a supply circuit coupled between said source of power and said devices; control means in said supply circuit for controlling the operation of said devices; a source of a control voltage; translation displacement means coupled to said devices and to said control voltage source for developing an output in response to said devices departing from synchronism, said output having a phase indicative of the one of said devices which departs from synchronism; and circuit means coupled to said translation displacement means, to said control voltage source, and to said control means for modifying said output and for vectorially combining said modified output and said control voltage and impressing the resultant on said control means to periodically change the energization of said one of said devices.

5. In a system employing a plurality of electrical translation devices which are to be maintained in synchronism, the combination of: a source of power; a supply circuit coupled between said source of power and said devices; switch means in said supply circuit for controlling the operation of said devices; a source of a control voltage; translation displacement means coupled to said devices and to said control voltage source for developing an output in response to said devices departing from synchronism, said output having a phase indicative of the one of said devices which departs from synchronism; and circuit means coupled to said translation displacement means, to said control voltage source, and to said switch means for modifying said output and for vectorially combining said modified output and said control voltage and impressing the resultant on said switch means to periodically de-energize said one of said devices.

6. In a system employing a plurality of electrical translation devices which are to be maintained in synchronism, the combination of: a source of power; a supply circuit coupled between said source of power and said devices; control means in said supply circuit for controlling the operation of said devices; a source of a control voltage; translation displacement means coupled to said devices and to said control voltage source for developing an output in response to said devices departing from synchronism, said output having an amplitude representative of the degree of asynchronization of said devices and a phase indicative of the one of said devices which departs from synchronism; and circuit means including a saw-tooth wave generator coupled to said translation displacement means, to said control voltage source, and to said control means for modifying said output and for vectorially combining said modified output and said control voltage and impressing the resultant on said control means to periodically change the energization of said one of said devices.

7. In a system employing a plurality of electrical translation devices which are to be maintained in synchronism, the combination of: a source of power; a supply circuit coupled between said source of power and said devices; switch means in said supply circuit for controlling the operation of said devices; a source of a control voltage; translation displacement means coupled to said devices and to said control voltage source for developing an output in response to said devices departing from synchronism, said output having an amplitude representative of the degree of asynchronization of said devices and a phase indicative of the one of said devices which departs from synchronism; and circuit means coupled to said translation displacement means to said control voltage source, and to said switch means for modifying said output and for vectorially combining said modified output and said control voltage and impressing the resultant on said switch means to periodically de-energize said one of said devices.

8. In a system employing a plurality of electrical translation devices which are to be maintained in synchronism, the combination of: a source of power; a supply circuit coupled between said source of power and said devices; electromagnetically actuated switch means in said supply circuit for controlling the operation of said devices; a source of a control voltage; translation displacement means coupled to said devices and to said control voltage source for developing an output in response to said devices departing from synchronism, said output having a phase indicative of the one of said devices which departs from synchronism; and circuit means coupled to said translation displacement means, to said control voltage source and to said switch means for modifying said output and for vectorially combining said modified output and said control voltage and impressing the resultant on the electromagnets of said switch means to periodically change the energization of said one of said devices.

9. In a system employing a plurality of electrical translation devices which are to be maintained in synchronism, the combination of: a source of power; a supply circuit coupled between said source of power and said devices; electromagnetically actuated switch means in said supply circuit for controlling the operation of said devices; a source of a control voltage; translation displacement means coupled to said devices and to said control voltage source for developing an output in response to said devices departing from synchronism, said output having an amplitude representative of the degree of asynchronization of said devices and a phase indicative of the one of said devices which departs from synchronization; and circuit means including a saw-tooth wave generator coupled to said translation displacement means to said control voltage source, and to said switch means for modifying said output and for vectorially combining said modified output and said control voltage and impressing the resultant on the electromagnets of said switch means to periodically change the energization of said one of said devices.

10. In a system employing a plurality of electrical translation devices which are to be maintained in synchronism, the combination of: a source of power; a supply circuit coupled between said source of power and said devices; electromagnetically actuated switch means in said supply circuit for controlling the operation of said devices; a source of a control voltage; translation displacement means coupled to said devices and to said control voltage source for developing an output in response to said devices departing from synchronism, said output having an amplitude representative of the degree of asynchronization of said devices and a phase indicative of the one of said devices which departs from synchronism; and circuit means coupled to said translation displacement means, to said control voltage source, and to said switch means for modifying said output and for vectorially combining said modified output and said control voltage and impressing the resultant on the electromagnets of said switch means to periodically de-energize said one of said devices.

11. In a system employing first and second electrical translation devices which are to be maintained in synchronism, the combination of: a source of power; a source of a control voltage; a supply circuit coupled between said source of power and each of said devices; electromagnetically actuated switch means in said supply circuit individual to each of said devices for selectively controlling the energization thereof; translation displacement means coupled to said devices and to said control voltage source for developing an output in response to said devices departing from synchronism, said output having an amplitude representative of the degree of asynchronization of said devices and a phase indicative of whether said first device moves faster or slower than said second device; and circuit means coupled to said translation displacement means, to said control voltage source, and to said switch means for modifying said output and for vectorially combining said modified output and said control voltage and impressing the resultant on the electromagnets of said switch means to periodically de-energize the one of said devices which moves faster than the other one.

12. In combination with a plurality of electrical translation devices having means for energizing said devices: translation displacement means coupled to said devices; an output circuit coupled to said translation displacement means for developing an error signal in response to one of said devices becoming asynchronized; a saw-tooth voltage generator, the input to said generator being coupled with said devices for generating a saw-tooth voltage when devices become asynchronized; and circuit means for vectorially combining said error signal with the output of said saw-tooth voltage generator, whereby the energization of said one of said devices is periodically changed to cause it to be resynchronized and returned into phase coincidence with the remainder of said devices.

13. In combination with a plurality of electrical translation devices having means for energizing said devices: translation displacement means coupled to said devices; an output circuit coupled to said translation displacement means for developing an error signal in response to one of said devices becoming asynchronized; a saw-tooth voltage generator, the input to said generator being coupled with said devices for generating a saw-tooth voltage when said devices become asynchronized; and circuit means for vectorially combining said error signal with the output of said saw-tooth voltage generator, whereby said one of said devices is periodically de-energized to cause it to be resynchronized and returned into phase coincidence with the other of said devices.

References Cited in the file of this patent

UNITED STATES PATENTS

| Number | Name | Date |
| --- | --- | --- |
| 2,020,942 | Gulliksen | Nov. 12, 1935 |
| 2,025,315 | Stansbury | Dec. 24, 1935 |
| 2,394,361 | Bruderlin | Feb. 5, 1946 |
| 2,411,450 | Miller et al. | Nov. 19, 1946 |
| 2,443,657 | King | June 22, 1948 |
| 2,533,473 | Kille | Dec. 12, 1950 |
| 2,634,387 | Mercier | Apr. 7, 1953 |